United States Patent
Calver et al.

(10) Patent No.: US 7,421,112 B2
(45) Date of Patent: Sep. 2, 2008

(54) CARGO SENSING SYSTEM

(75) Inventors: Andrew J. Calver, Clifton Park, NY (US); Rick Cobello, Middlegrove, NY (US); Kurtis G. McKenney, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 10/800,342

(22) Filed: Mar. 12, 2004

(65) Prior Publication Data

US 2005/0199782 A1 Sep. 15, 2005

(51) Int. Cl.
*G06K 9/00* (2006.01)

(52) U.S. Cl. .................. 382/154; 382/143; 382/203; 348/148; 348/152

(58) Field of Classification Search .............. 382/154
See application file for complete search history.

(56) References Cited

U.S. PATENT DOCUMENTS

| | | | |
|---|---|---|---|
| 3,806,633 A | | 4/1974 | Coleman |
| 4,249,207 A | * | 2/1981 | Harman et al. ............. 348/152 |
| 4,688,244 A | * | 8/1987 | Hannon et al. ............. 377/58 |
| 4,750,197 A | * | 6/1988 | Denekamp et al. ....... 455/404.2 |
| 4,871,252 A | * | 10/1989 | Beni et al. ................. 356/457 |
| 5,093,869 A | * | 3/1992 | Alves et al. ............... 382/199 |
| 5,557,254 A | | 9/1996 | Johnson et al. |
| 5,666,441 A | * | 9/1997 | Rao et al. .................. 382/203 |
| 5,808,670 A | * | 9/1998 | Oyashiki et al. ............ 348/143 |
| 5,953,448 A | * | 9/1999 | Liang ........................ 382/154 |
| 5,963,664 A | * | 10/1999 | Kumar et al. ............... 382/154 |
| 6,339,745 B1 | | 1/2002 | Novik |
| 6,366,689 B1 | * | 4/2002 | Rao et al. .................. 382/145 |
| 6,437,702 B1 | | 8/2002 | Ragland et al. |
| 6,476,812 B1 | * | 11/2002 | Yoshigahara et al. ........ 345/427 |
| 6,532,299 B1 | * | 3/2003 | Sachdeva et al. ........... 382/128 |
| 2002/0044682 A1 | * | 4/2002 | Weil et al. ................. 382/154 |
| 2002/0085747 A1 | * | 7/2002 | Yoshigahara et al. ....... 382/154 |
| 2002/0125435 A1 | * | 9/2002 | Cofer et al. .............. 250/341.1 |
| 2004/0233284 A1 | * | 11/2004 | Lesesky et al. ............. 348/148 |

OTHER PUBLICATIONS

Reynolds, James C. et al., "GPS-Based Vessel Position Monitoring and Display System," IEEE AES Magazine, Jul. 1990, pp. 16-22.

* cited by examiner

*Primary Examiner*—Vikkram Bali
*Assistant Examiner*—David P Rashid
(74) *Attorney, Agent, or Firm*—Lee & Hayes, PLLC (57) ABSTRACT

A cargo sensing system is configured to determine if cargo is present within a container. In one implementation, the cargo sensing system senses lines within an image of a cargo space. The lines may be straight, curved or otherwise configured, and are evaluated for indications of the presence of cargo within the cargo space. In a first implementation of the cargo sensing system, the lines within the cargo space are formed by a laser tracing over a predetermined projection pattern. In a second implementation of the cargo sensing system, the lines sensed are formed by intersection of planes defining the cargo space.

20 Claims, 5 Drawing Sheets

CARGO SENSING SYSTEM

TECHNICAL FIELD

The present invention is directed to a cargo sensing system.

BACKGROUND

In the transportation industry, a large amount of cargo is shipped to and from numerous places around world on a daily basis. Oftentimes, such cargo is transported in trailers or other cargo containers that can be easily coupled to different vehicles for transport to a destination.

Monitoring the status of cargo in trailers (as well as in other cargo containers) is very important. For example, being able to know whether a particular trailer is or is not loaded with cargo is important for shipping companies and/or trailer owners. One way to know whether a particular trailer is or is not loaded with cargo is to manually open the door of the trailer and look inside. However, this can be burdensome as it requires a person to be physically located at the trailer and it can be a very time-consuming process (particularly in situations where there are large numbers of trailers being monitored). Another way to know whether a particular trailer is or is not loaded with cargo is to use an acoustic sensor to sense whether cargo is loaded in the trailer. However, such acoustic sensor systems are troublesome because they are typically difficult to configure and calibrate, and oftentimes require manual adjustments by a user during operation.

Thus, it would be beneficial to provide an improved way to monitor cargo.

SUMMARY

A cargo sensing system is configured to determine if cargo is present within a container. In one implementation, the cargo sensing system senses lines within an image of a cargo space. The lines may be straight, curved or otherwise configured, and are evaluated for indications of the presence of cargo within the cargo space. In a first implementation of the cargo sensing system, the lines within the cargo space are formed by a laser tracing over a predetermined projection pattern. In a second implementation of the cargo sensing system, the lines sensed are formed by intersection of planes defining the cargo space.

BRIEF DESCRIPTION OF THE DRAWINGS

The following detailed description refers to the accompanying figures. In the figures, the left-most digits(s) of a reference number identifies the figure (FIG.) in which the reference number first appears. Moreover, the same reference numbers are used throughout the drawings to reference like features and components.

DETAILED DESCRIPTION

A cargo sensing system is configured to determine if cargo is present within a container. In one implementation, the cargo sensing system senses lines within an image of a cargo space. The image may be obtained from a camera, configured to detect visible or IR light. The lines may be straight, curved or otherwise configured, and are evaluated for indications of the presence of cargo within the cargo space. The evaluation may consider such factors as the presence of discontinuities (e.g. "gaps" in the lines), variations in brightness of the lines, and/or changes in slope of one or more lines. In most cases, discontinuity gaps, variations in brightness and changes in slope indicate the presence of cargo within the cargo space. In a first implementation of the cargo sensing system, the lines within the cargo space are formed by a laser tracing over a predetermined projection pattern. In a second implementation of the cargo sensing system, the lines sensed are formed by intersection of planes defining the cargo space.

Figure 1:
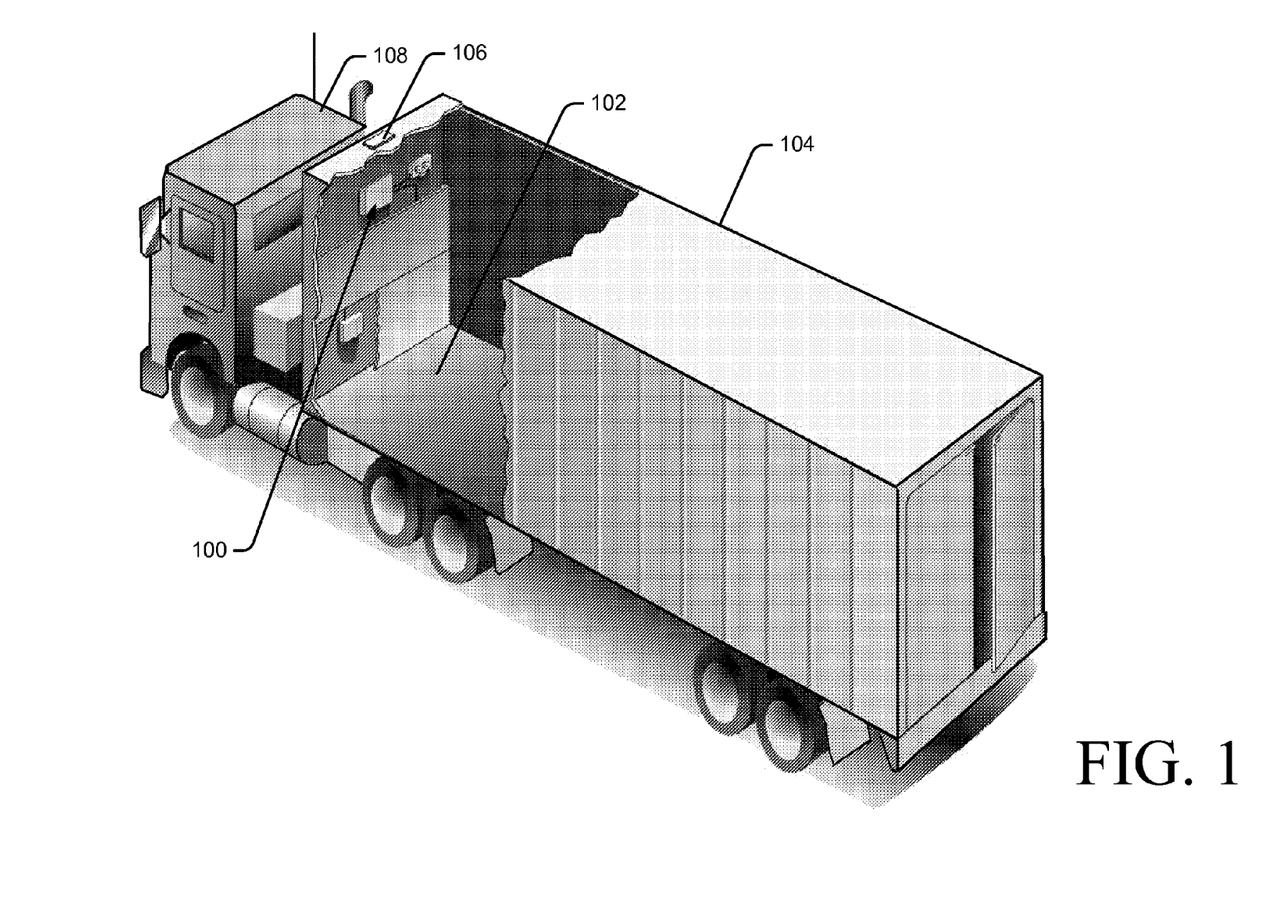
FIG. 1 illustrates a cargo space within which an exemplary cargo sensing system can be implemented.

FIG. 1 illustrates an exemplary cargo sensing system 100 for operation within a cargo space 102. The cargo space 102 illustrated in FIG. 1 is the interior of a trailer 104 within which the cargo sensing system 100 is mounted. In the exemplary illustration, the system 100 is mounted at the front of trailer 104 towards the top of the cargo space 102, although the system 100 may alternatively be mounted in other locations within trailer 104.

The trailer 104 may be equipped with an antenna 106, which is typically mounted externally and configured to send and/or receive information from one or more remote sources (e.g., a central management location operated by a trucking company). The antenna 106 can enable the cargo sensing system 100 to receive requests for an indication of whether cargo is present in the trailer 104, and/or allow the system 100 to communicate an indication(s) of whether cargo is present in trailer 104 to another component, device or location.

Although in the exemplary illustration of FIG. 1, the cargo sensing system 100 is illustrated as a trailer 104 coupled to a truck 108, the cargo sensing system 100 could alternatively be configured with little modification for use with other types of cargo and shipping containers, such as those used with airfreight, railroad or ocean-going or river barge traffic.

Figure 2:
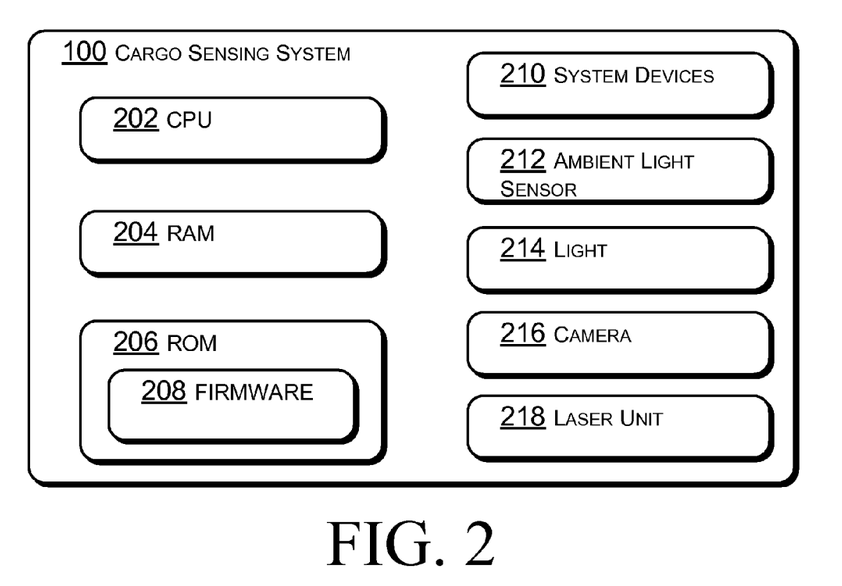
FIG. 2 is a block diagram illustrating exemplary components within the cargo sensing system of FIG. 1.

FIG. 2 is a block diagram illustrating an exemplary cargo sensing system 100. A CPU 202 is able to access RAM 204 and ROM 206. The ROM may include firmware 208, which may include instructions which implement much of the functionality of the cargo sensing system 100. System devices 210, such as disk drives, I/O cards, keyboard or keypad data entry systems and other devices may be present in some embodiments.

In the embodiment of the cargo sensing system 100 of FIG. 2, an ambient light sensor 212 is configured to determine the level of ambient lighting within the cargo space 102. Where ambient lighting is below a threshold value, it may be assumed that people are not present within the cargo space 102. Accordingly, a projection pattern traced by a laser (as described below) may be used without alarming personnel. Additionally, where people are not present within the cargo area, it may be assumed that detected objects are cargo. Where ambient lighting is above the threshold value, detection of edges within the cargo space (as described below) may be used in place of the laser projection pattern. A light 214 may be turned on, if needed, to improve marginal ambient lighting.

A camera 216 may is configured and located to provide a view of some or all of the cargo space 102. The camera 216 may be a conventional digital still-frame or video camera, or may be configured as an infrared (IR) or ultraviolet (UV) imaging device.

A laser unit 218 is configured to trace a pattern, such as a projection pattern of lines, within the cargo space 102. Accordingly, the laser 218 typically includes a mirror, prism or solid-state refractive lens which is used to refresh the traced pattern. The laser 218 can be or any color, provided it is compatible with the camera 216. In a preferred implementation, the laser is a low-power class 1 device which will not harm human eye tissue. The laser may additionally be an IR device, which is invisible to the human eye. Such an IR laser has the advantage of operating without the possibility of alarming personnel in the area. Additionally, the laser unit 218 should be located somewhat separately from the camera 216. The separation allows the camera to see changes in the slope (i.e. direction) of the lines in the projection pattern that would not be evident when viewed from the same perspective as the laser. The degree of separation depends on the size of the cargo area. For example, where the cargo area is a truck, a one-foot separation may be sufficient. A larger cargo area may require a greater distance between the camera and the laser.

Figure 3:
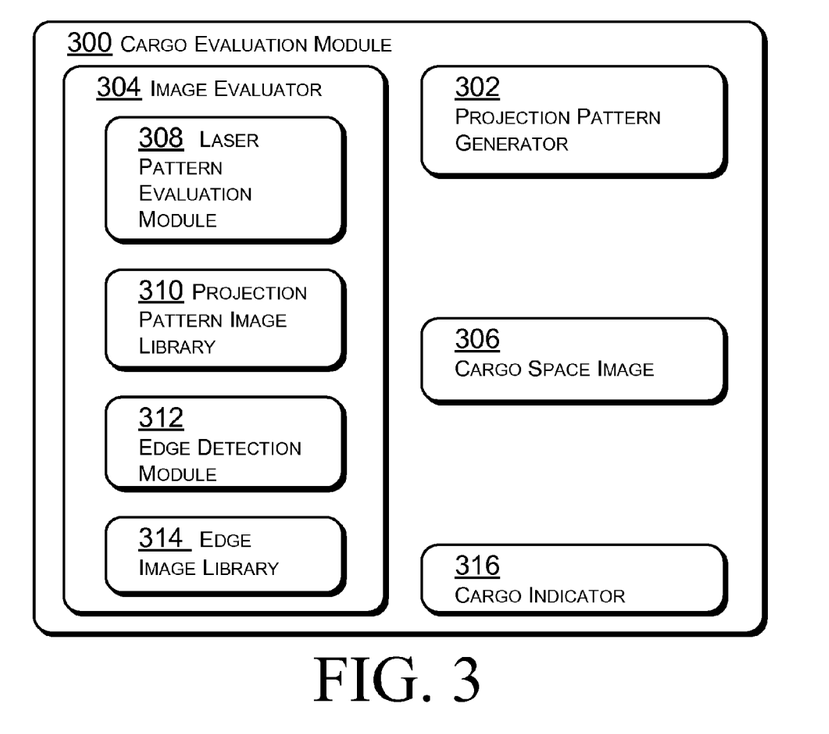
FIG. 3 is a block diagram illustrating an exemplary implementation of firmware within the cargo sensing system of FIG. 2.

FIG. 3 is a block diagram illustrating an exemplary implementation of a cargo evaluation module 300, which may be implemented within the firmware 208 (FIG. 2) of the cargo sensing system 100 (FIG. 1). In one implementation, the cargo evaluation module 300 receives an input from sensor 212 to determine the level of ambient lighting within the cargo space 102. A level of ambient lighting is below a threshold is interpreted to mean that the cargo space 102 is substantially dark, and that personnel are not present. Accordingly, objects determined to be present will not be personnel, and the cargo evaluation module 300 may activate a projection pattern generator 302, which operates the laser unit 218 (FIG. 2) to create a projection pattern within the cargo space 102. In one example, the projection pattern generator 302 traces the laser 218 to create a projection pattern. The projection pattern may include one or more lines which will strike cargo, if present. Thus, the projection pattern generator 302 may trace the laser 218 over a plurality of generally parallel lines within the cargo space.

Figure 4:
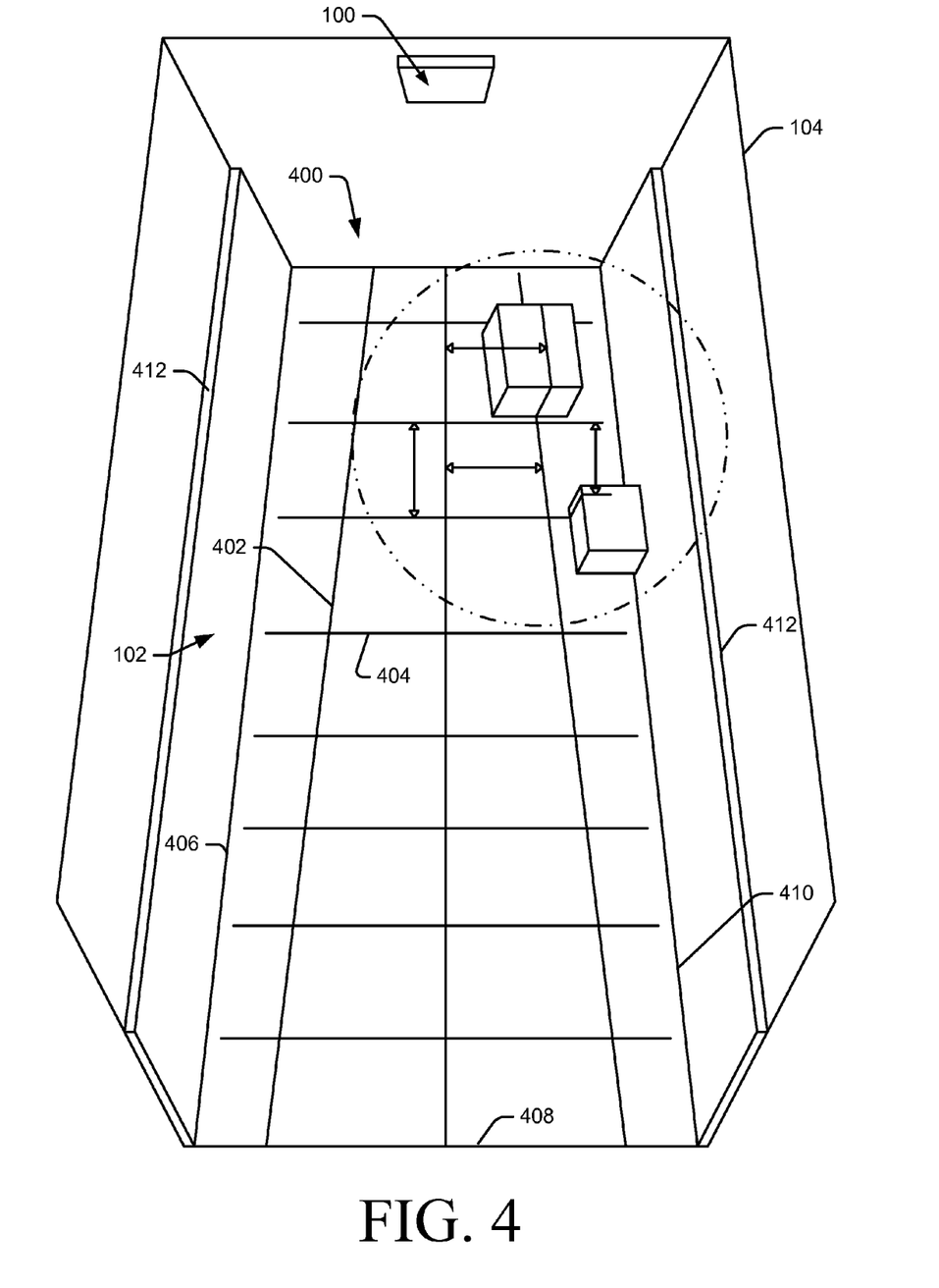
FIG. 4 is a view of an inside of a cargo space, showing an exemplary projection pattern generated by the cargo sensing system of FIG. 1.

Referring briefly to FIG. 4, a projection pattern 400, comprising lengthwise lines 402 and/or cross-wise lines 404, may be generated by the laser unit 218 at the direction of the projection pattern generator 302. Note that in some applications, only the lengthwise lines 402 may be required. Other lines may be eliminated to simplify the design. While linear lines are illustrated, other lines, such as curves, sinusoids or square waves, could be substituted.

Referring again to FIG. 3, an image evaluator 304 receives an image 306 from the camera 216 (FIG. 2). Where the image includes the projection pattern 400, a laser projection pattern evaluation module 308 is configured to examine the projection pattern 400 for distortion or discontinuities.

Figure 5:
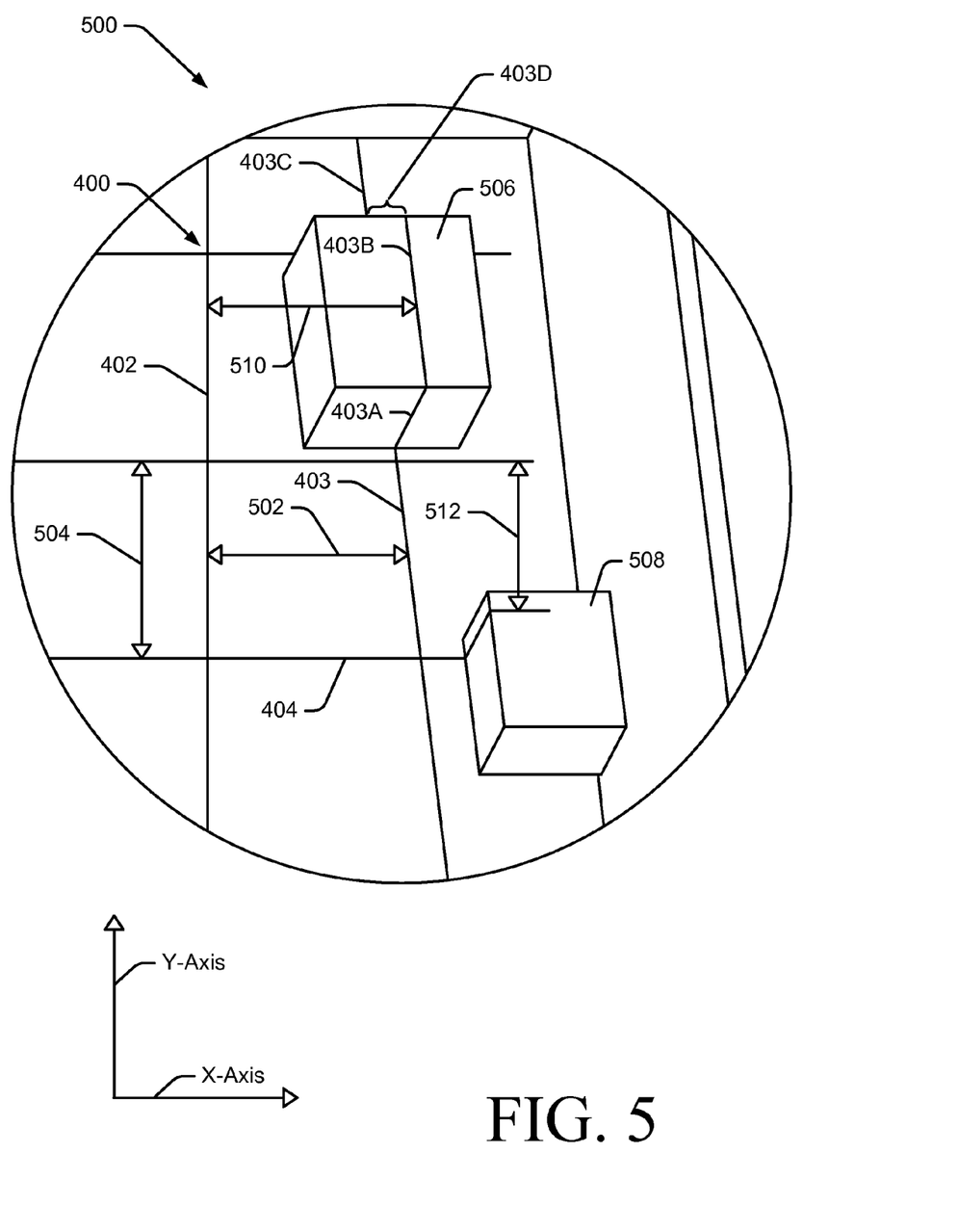
FIG. 5 is an enlarged view of portions of FIG. 4.

For example, referring briefly to the enlarged view 500 of the projection pattern 400 seen in FIG. 5, it can be seen that lengthwise projection pattern elements 402 are separated by an expected distance 502, while cross-wise projection pattern elements 404 are separated by an expected distance 504. However, where cargo 506, 508 remain in the cargo area, the distance between projection pattern lines may be altered. For example, where the projection pattern line is traced by the laser onto the top of the box of cargo, the distance 510 between two lengthwise projection pattern lines is increased (i.e. distance 510 is greater than distance 502). Similarly, the distance 512 between the cross-wise projection pattern lines is decreased (i.e. distance 512 is less than distance 504) because cargo 508 prevented the laser from tracing the line on the floor of the cargo area.

To detect the cargo, the laser projection pattern evaluation module 308 may be configured to measure the distance between a first representative point on a line 402, 404, and a second representative point on a second (or the same) line 402, 404, and to thereby determine if distortion or discontinuity of one or more lines is present (thereby indicating the presence of cargo).

For example, in one embodiment of the laser projection pattern evaluation module 308, pixels within the projection pattern may be identified by their color, intensity, and/or contrast with adjacent pixels or other means. More particularly, for example, where two pixels have the same Y-coordinate, the X-coordinates may be compared to determine if the expected distance separates the pixels, or if that distance has been altered by cargo.

Alternatively, a projection pattern image library or database 310 may include examples of cargo space images of cargo spaces which either contain at least some cargo or are empty. The image 306 may be compared to one or more images from within the projection pattern image library or database 310. Where differences between the image 306 and images of empty cargo area(s) within the projection pattern image database 310 exceed a threshold value, it may be assumed that cargo is present within the cargo space, and that that cargo deformed the image 306. Where the differences do not exceed the threshold, it may be assumed that the cargo area is empty. Alternatively, where the cargo space image 306 is sufficiently similar to an image of a cargo-containing cargo area contained within the projection pattern image library 310 then it may be assumed that cargo is present. In one implementation, small areas of the cargo space image 306 (e.g. images representing two or three feet square) may be compared to similarly sized images of cargo-containing cargo spaces within the projection pattern image database 310. Where the image 306 is sufficiently similar to one or more images within the database 310, it may be assumed that cargo is present.

Where the ambient lighting detected by sensor 212 exceeds a threshold, indicating that the cargo space 102 may be well-lit and that personnel may be present, the projection pattern generator 302 may not be used. As an alternative, a edge detection module 312 may be used to prevent the use of a laser in an area staffed by personnel. The edge detection module 312 uses edge detection software to detect edges within the cargo space 102. For example, the edge detection module 312 detects the intersection of planes (i.e. the walls and floor) defining the cargo space 102. Thus, the edge detection module 310 detects lines 406-410 formed by the meeting of the walls and floor of the cargo space 102. Additionally, where the cargo space 102 is double-walled on lower portions of the walls, lines 412 may be discernable. Where any of these lines are obscured, such as by cargo within the cargo space 102, the lines appear to have discontinuities, gaps, breaks, distortions and other flaws. Accordingly, an image 306 taken by the camera 216 may be processed by the edge detection module 312 to reveal the presence or absence of cargo.

In some applications, the edge detection module 312 may compare the cargo space image 306 to images within an edge image library or database 314. The edge image database 314 may include a plurality of standard images of empty cargo spaces. Where differences between the cargo space image 306 and images within the image configuration library 314 are less than a threshold value, the cargo space 102 may be assumed to be empty; where the differences exceed the threshold, the cargo space 102 may be assumed to contain cargo. The cargo indicator 316 provides an indication to the user reflecting the presence or absence of cargo.

Figure 6:
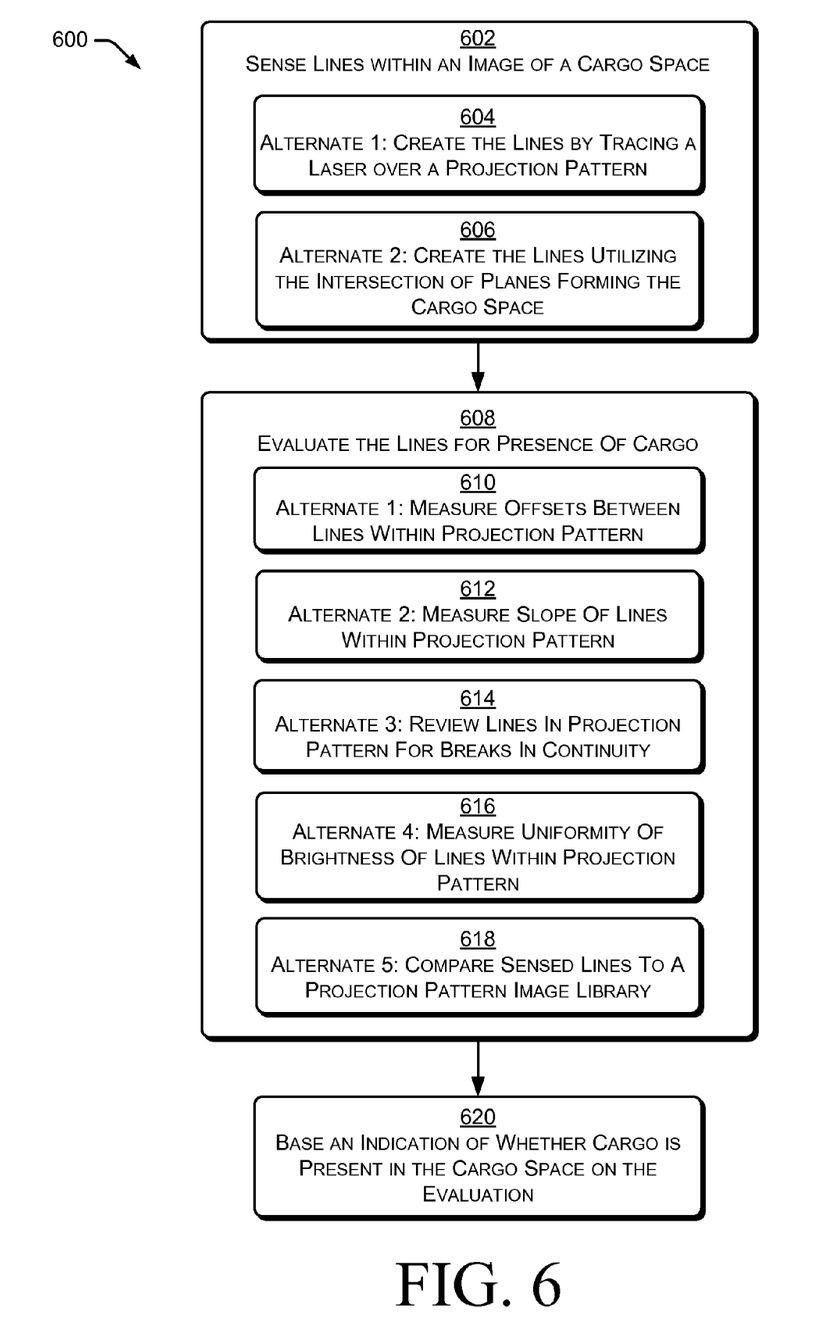
FIG. 6 is a flowchart illustrating an exemplary process for sensing cargo.

FIG. 6 is a flowchart illustrating an exemplary process 600 for sensing cargo within a cargo space 102. At block 602, lines within an image of a cargo space are sensed. The lines may form projection patterns, curves, arcs, waves or other patterns to result in formation of an image. The image may be obtained by the camera 216, and is typically in a digital format. At block 604, in one embodiment, the lines may be created by tracing a laser over a projection pattern 400 at an adequate refresh rate. The projection pattern 400 may include lengthwise parallel lines 402, and may additionally include widthwise parallel lines 404. An alternative projection pattern may be substituted, particularly where the projection pattern results in a pattern which makes readily apparent distortions, offsets and changes caused by the presence of cargo, and wherein the projection pattern allows rapid calculation of the presence of such distortions.

At block 606, in an alternative or supplement to block 604, some or all of the lines may be created by the intersection of planes forming the cargo space. As seen in FIG. 4, the intersection of the floor and walls forms lines 406-410, and the double-wall construction results in lines 412.

At block 608, the lines are evaluated for indications of the presence of cargo within the cargo space. A large number of factors indicating cargo presence could be evaluated. For example, the lines could be evaluated for differences between expected and actual distances of their separation; unexpected slope (i.e. angle of orientation) of all or part of one or more lines; unexpected non-uniformity of the brightness of one or more line; or unexpected discontinuities. In an example implementation seen at block 610, distances between the lines of the cargo space image 306 (FIG. 3) taken of the projection pan em are measured. Referring particularly to FIG. 5, it can be seen that the lines labeled 402 and 403 are not separated by a uniform distance. In particular, the difference between distance 502 and distance 510 indicates the presence of cargo 506. Accordingly, in one implementation, the offset or distance between lines within the projection pattern can be measured, and the measurements used to determine if cargo is present.

In a second implementation seen at block 612, the slope of lines within the cargo space image 306 (FIG. 3) of the projection pattern may be evaluated, and compared to expected values for a determination if the presence of cargo is indicated. Thus expected values of the slope would indicate an empty cargo area; in contrast, unexpected values for slope could indicate cargo resulting in unexpected values for the slope of various lines, which would be based on the cargo contained. Referring briefly to FIG. 5, it can be seen that the slope or angle of line 403 is altered at 403A by the presence of cargo box 506. That is, the slope or angle of line 403 is not the same as the slope or angle of line 403A. Accordingly, in one implementation, the slope or angle of a line within the projection pattern can be measured, and the measurements used to determine if cargo is present.

In a third implementation seen at block 614, lines within the cargo space image 306 (FIG. 3) of the projection paffern are reviewed for breaks in continuity. A break in continuity would result where the line formed by the laser or by the joining of two edges of the cargo area (e.g. floor and wall) is broken into two or more line segments. This can happen when the light from the projection pattern strikes cargo. Thus, where a break in the continuity of a line is located (such as by location of two line segments) the break in continuity is an indication of the presence of cargo. Referring to FIG. 5, it can be seen that line 403B is discontinuous from line 403C. That is, these lines constitute two line segments, which are separated by a distance 403D. Accordingly, in one implementation, the continuity of a line within the projection pattern can be reviewed, and the discovery of two line segments separated by a break may indicate that cargo is present.

In a fourth implementation, seen at block 616, uniformity of the brightness of lines within the cargo space image 306 (FIG. 3) of the projection pattern is measured. Where brightness is sufficiently non-uniform—particularly where brightness changes rapidly over short distances along a line within the projection pattern—it is likely that some of the lines forming the projection pattern are in contact with cargo. For example, if a laser traces a projection pattern over cargo (and possibly the floor of a cargo area) different pieces or boxes of cargo may reflect the laser with different intensities, due in part to the angle, color or markings of various cargo surfaces. Accordingly, in one implementation, the uniformity of the brightness of reflected laser light within the projection pattern can be reviewed, and the discovery of differences in brightness—particularly between nearby points on the projection pattern—may indicate that cargo is present.

In a fifth implementation, seen at block 618, the cargo space image 306 (FIG. 3) taken by the camera 216 (FIG. 2) is compared to images within the projection pattern image library 310 (FIG. 3). Where the image 306 is similar to a cargo-containing image or a cargo-free image from the projection pattern image library 310, it may be assumed that cargo is or is not present, as appropriate.

At block 620, an indication of whether cargo is present in the cargo space 102 is based on the evaluation. The indication may be sent to a remote location, such as a freight transportation headquarters. The indication may be transmitted by radio using antenna 106, or any alternative communication means.

Although the disclosure has been described in language specific to structural features and/or methodological steps, it is to be understood that the appended claims are not limited to the specific features or steps described. Rather, the specific features and steps are exemplary forms of implementing this disclosure. For example, while, actions described in blocks of the flow diagrams may be performed in parallel with actions described in other blocks, the actions may occur in an alternate order, or may be distributed in a manner which associates actions with more than one other block. And, while several methods by which a projection pattern may be defined have been disclosed, it is clear that alternative projection patterns could be constructed, while in keeping within the teachings of the instant disclosure. And, while lines and projection patterns have been disclosed as exemplary patterns, it is clear that lines forming curves, arcs, waves and complex patterns having any number of appearances could be used, while still in keeping with the teachings herein. Similarly, while a number of systems and methods have been disclosed which evaluate projections patterns for indications of the presence of cargo, it is clear that these systems and methods are examples, and that other systems and methods keeping within the teachings of this disclosure could additionally be defined. And further, while the use of several thresholds has been disclosed, it is clear that the thresholds could be adjusted to achieve desired results.

The invention claimed is:

1. A system for detecting a presence of cargo in a container, comprising:
   an ambient light sensor to determine if an ambient light level within the container exceeds a threshold value;
   a camera to obtain an image of an interior of the container;

an edge detection module configured to recognize lines formed by intersection of floor and walls of the container, and to compare the recognized lines to a plurality of images of empty cargo containers within an edge image library, and upon failure to match the recognized lines to an image within the edge image library, to within a threshold level of differences, to assume that cargo is present within the container;

a laser unit, controlled by a projection pattern generator and operated only when ambient lighting is below the threshold value, to create a laser projection pattern in the container; and a laser pattern evaluation module to evaluate the laser projection pattern to determine if cargo is present in the container.

2. The system of claim 1, wherein ambient light below the threshold results in use of an auxiliary light source while the edge detection module is operating.

3. The system of claim 1, wherein ambient light above the threshold results in operation of the edge detection module without an auxiliary light source and prevents operation of the laser unit and laser pattern evaluation module.

4. The system of claim 1, wherein the threshold value associated with the ambient light level is set so that light levels equal to or greater than the threshold value would reasonably allow personnel to work within in the container.

5. The system of claim 1, wherein the edge detection module compares the recognized lines to plural images within the edge image library to determine differences, and where the differences with one image in the library are less than a threshold difference, to assume the container to be empty.

6. The system of claim 1, wherein the edge detection module evaluates the recognized lines for indications of cargo, including gaps, breaks and distortions of lines formed by intersection of floor and walls of the container.

7. The system of claim 1, wherein the laser pattern evaluation module evaluates two points of the laser projection pattern on the image having similar Y-coordinates to see if a distance between X-coordinate values of the points indicate alteration of the projection pattern by cargo within the container.

8. The system of claim 1, wherein the laser pattern evaluation module evaluates the image for distortions and discontinuities not present in an image of the projection pattern in the container obtained when no cargo was present.

9. A method of sensing cargo in a container, comprising:

verifying that personnel are not inside the container by sensing an ambient light level to determine if the ambient light level exceeds a threshold value and assuming that personnel are not in the container if the ambient light level is below a threshold;

operating an auxiliary lighting unit when the ambient light level does not exceed the threshold;

obtaining an image of an inside of the container using a camera;

evaluating lines in the image formed by intersection of floor and walls of the container for indications of cargo, wherein the evaluation compares lines found by edge detection of the walls and floor in the image to an edge image library comprising a plurality of images of empty cargo containers, and upon failure to match the image to an image within the edge image library to within a threshold level of differences, assumes that cargo is present within the container;

projecting a laser projection pattern into the container using a laser unit, only when ambient lighting is below the threshold value and personnel are not inside the container; and evaluating the laser projection pattern to determine if cargo is present in the container, wherein the evaluating selects at least two lines from the image of the projection pattern, measures a distance between those lines, and compares the measured distance to an expected distance as an indicator that cargo within the container disrupted the laser projection pattern.

10. The method of claim 9, wherein evaluating lines in the image formed by intersection of floor and walls of the container for indications of cargo also evaluates lines formed by double wall construction of the container.

11. The method of claim 9, wherein evaluating lines in the image includes looking for gaps, breaks and distortions of lines formed by intersection of floor, walls and double walls of the container.

12. The method of claim 9, evaluating the laser projection pattern evaluates the image for distortions and discontinuities not present in an image of the projection pattern in the container obtained when no cargo was present.

13. The method of claim 9, wherein the evaluating the laser projection pattern evaluates two points of the laser projection pattern on the image having similar Y-coordinates to see if a distance between X-coordinate values of the points indicate alteration of the projection pattern by cargo within the container.

14. A cargo sensing system, comprising:

an ambient light sensor to determine if an ambient light level within a container exceeds a threshold value;

a camera to obtain an image of an interior of the container;

an edge detection module configured to evaluate the image to recognize lines formed by intersection of a floor and walls of the container and to recognize indications of cargo, wherein ambient light below the threshold results in use of an auxiliary light source while the edge detection module is operating, wherein the edge detection module is additionally configured to compare results of edge detection of the image to each of a plurality of images within an edge image library associated with standard images of empty cargo containers, and upon failure to match the image to an image within the edge image library to within a threshold level of differences, to assume that cargo is present within the container;

a laser unit, controlled by a projection pattern generator and operated only when ambient lighting is below the threshold value, to create a laser projection pattern within the interior of the container; and a laser pattern evaluation module to evaluate the laser projection pattern to determine if cargo is present in the container, wherein the evaluation module selects at least two lines from the image of the laser projection pattern, measures a distance between those lines, and compares the measured distance to an expected distance as an indicator of whether cargo within the container disrupted the laser projection pattern.

15. The cargo sensing system of claim 14, wherein the threshold value associated with the ambient light level is set so that light levels equal to or greater than the threshold value would reasonably allow personnel to work within in the container.

16. The system of claim 14, wherein edge detection module is also configured to recognize in the image lines formed by double wall construction of the container.

17. The system of claim 14, wherein the edge detection module evaluates lines recognized at intersections of the floor and the walls for indications of cargo, including gaps, breaks and distortions.

18. The system of claim 14, wherein the laser pattern evaluation module evaluates two points of the laser projection pattern having similar Y-coordinates to see if a distance between X-coordinate values of the points indicates alteration of the projection pattern by cargo within the container.

19. The system of claim 14, wherein the laser pattern evaluation module evaluates the image for distortions and discontinuities not present in an image of the projection pattern in the container obtained when no cargo was present.

20. The system of claim 14, wherein the laser pattern evaluation module evaluates the image by comparison to a projection pattern database having images of empty cargo areas, and concludes cargo is present when differences exceed a threshold value.

* * * * *